No. 863,083. PATENTED AUG. 13, 1907.
A. McLEAN.
PROTECTOR FOR PNEUMATIC TIRES FOR MOTOR CARS AND SIMILAR VEHICLES.
APPLICATION FILED AUG. 28, 1905.
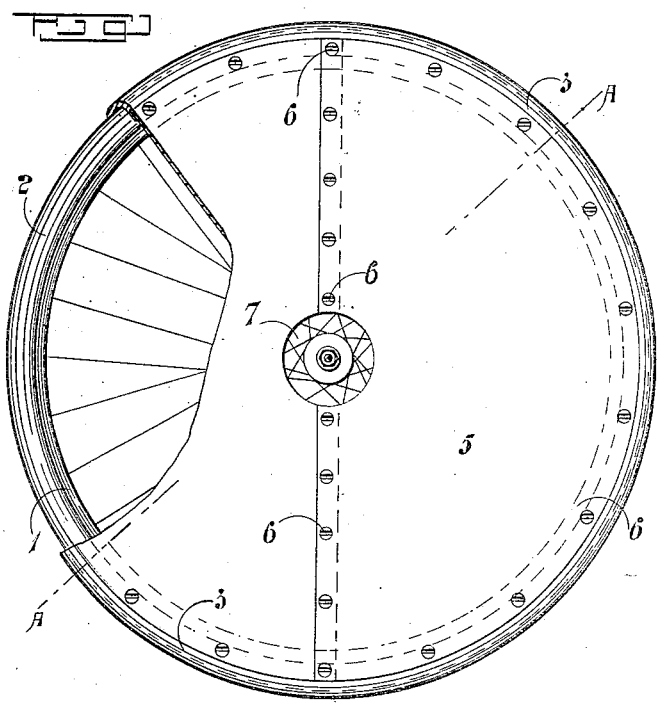
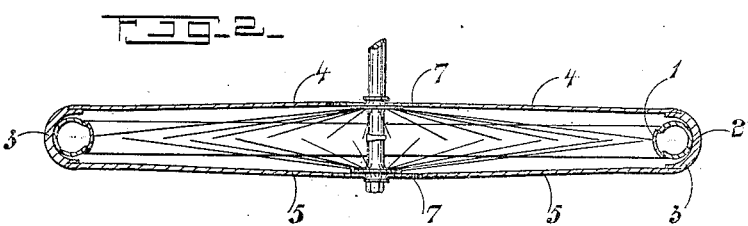
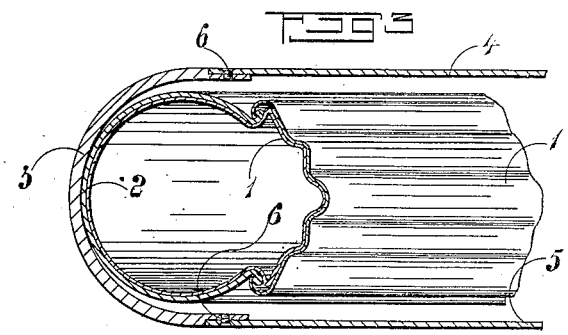
Witnesses:
E. S. Baldwin
J. T. Watson
Inventor: Alexander McLean.
By Henrie H. Hayward, Attorney

UNITED STATES PATENT OFFICE.

ALEXANDER McLEAN, OF BRAE SIDE, TI TREE POINT, NEW ZEALAND.

PROTECTOR FOR PNEUMATIC TIRES FOR MOTOR-CARS AND SIMILAR VEHICLES.

No. 863,083. Specification of Letters Patent. Patented Aug. 13, 1907.

Application filed August 28, 1905. Serial No. 276,099.

*To all whom it may concern:*

Be it known that I, ALEXANDER McLEAN, a subject of His Majesty the King of Great Britain and Ireland, residing at Brae Side, Ti Tree Point, in the Provincial District of Hawkes Bay, in the Colony of New Zealand, have invented certain new and useful Improvements in Protectors for Pneumatic Tires for Motor-Cars and Similar Vehicles, of which the following is a specification.

This invention provides an improved protector for the pneumatic tires of motor cars and similar vehicles.

According hereto I employ a ring of semi-circular section, the inner periphery of the ring being of slightly larger diameter than the rim of the wheel upon which it is to be employed.

The pneumatic tire closely fits the concavity of the ring, which revolves with it. Disk plates may be used to prevent dust from entering between the tire and the ring.

Referring to the accompanying drawing,—

Figure 1 is a side elevation partly in section,

Figure 2 a sectional plan on A—A, Figure 1, and

Figure 3 a section of the tire and rim on a larger scale.

The vehicle wheel 1 of ordinary construction and having the usual pneumatic tire 2 is fitted with the protecting ring 3 which is semi-circular in section, as clearly shown in Figure 2, the concavity being of a shape to receive the pneumatic tire which when inflated fits it closely.

The inner diameter of the ring is slightly larger than the rim of the wheel so that the rim, with the tire deflated, may be placed within the ring and then the tire inflated to fill the concavity of the ring. The ring and tire are thus attached together by the pressure of the air in the tire causing the tire to lock the rim and ring together throughout the periphery of the wheel.

To prevent dirt from getting between the ring and the tire the disk plates 4 and 5 one upon each side of the wheel are fitted, at their outer circumferential peripheries, into corresponding recesses formed in the ring and are held in position by countersunk screws 6.

A circular hole 7 is cut in the centre of each disk to clear the hub of the wheel.

When my invention is employed upon a wheel of comparatively large diameter it may be convenient to make the disks each in two or more sections, the edge of one section overlapping the edge of the other and being secured thereto by small bolts as clearly shown in Figure 1 of the drawing.

The protector is made of metal or other suitable material.

What I do claim and desire to secure by Letters Patent of the United States is:—

The combination with a wheel having a pneumatic tire thereon, of a continuous protecting ring of thin hard non-yieldable material adapted to be engaged by the tire when expanded and of continuous curved cross section, the radius of the curve of the cross section being greater than the radius of the curve of the cross section of the portion of the tire opposite the ring, whereby the tire touches the ring only along the center and the edges of the ring are free therefrom.

In testimony whereof I have signed my name to this specification in the presence of two witnesses.

ALEXANDER McLEAN.

Witnesses:
 E. P. O'DONNELL,
 K. WILSON.